(12) United States Patent
Poplack et al.

(10) Patent No.: US 9,379,846 B1
(45) Date of Patent: Jun. 28, 2016

(54) SYSTEM AND METHOD OF ENCODING IN A SERIALIZER/DESERIALIZER

(71) Applicant: Cadence Design Systems, Inc., San Jose, CA (US)

(72) Inventors: Mitchell G. Poplack, San Jose, CA (US); Simon Sabato, Saratoga, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 74 days.

(21) Appl. No.: 14/578,173

(22) Filed: Dec. 19, 2014

(51) Int. Cl.
*H03M 13/00* (2006.01)
*H04L 1/00* (2006.01)
*G06F 11/10* (2006.01)

(52) U.S. Cl.
CPC .............. *H04L 1/0041* (2013.01); *G06F 11/10* (2013.01)

(58) Field of Classification Search
CPC .............................. H04L 1/0041; G06F 11/10
See application file for complete search history.

(56) References Cited

U.S. PATENT DOCUMENTS

| | | |
|---|---|---|
| 5,036,473 A | 7/1991 | Butts et al. |
| 5,109,353 A | 4/1992 | Sample et al. |
| 5,475,830 A | 12/1995 | Chen et al. |
| 5,551,013 A | 8/1996 | Beausoleil et al. |
| 5,960,191 A | 9/1999 | Sample et al. |
| 6,009,256 A | 12/1999 | Tseng et al. |
| 6,035,117 A | 3/2000 | Beausoleil et al. |
| 6,051,030 A | 4/2000 | Beausoleil et al. |
| 6,618,698 B1 | 9/2003 | Beausoleil et al. |
| 7,739,093 B2 | 6/2010 | Beausoleil et al. |
| 2011/0264436 A1 | 10/2011 | Ni et al. |

OTHER PUBLICATIONS

Mike Butts; Logic Emulation and Prototyping: It's the Interconnect (Rent rules); RAMP at Stanford; Aug. 2010; 31 pages.

*Primary Examiner* — Sam Rizk
(74) *Attorney, Agent, or Firm* — Kaye Scholer LLP

(57) ABSTRACT

In one form a method of encoding a data word for serial transmission is provided, where a data word comprising a plurality of data bits is received, an invert bit having a bit value is appended to the data word, the data bits and invert bit are scrambled, ECC check bits are generated, and the data bits, invert bit, and ECC check bits are shuffled together to form an encoded word to be transmitted from a transmitter. A receiver may decode by implementing a decode process with error correction. The encoded word may also be DC balanced by checking the disparity of the bits to be encoded against a running disparity to invert or not the bits. An integrated circuit serializer/deserializer comprises hardware to perform encoding and/or decoding. A hardware functional verification system may implement the disclosed encoding/decoding for interconnections between emulation chips.

24 Claims, 6 Drawing Sheets

SYSTEM AND METHOD OF ENCODING IN A SERIALIZER/DESERIALIZER

FIELD

This patent document relates generally to the field of verifying the functionality of integrated circuit designs prior to fabrication. In particular, the present patent document relates to systems and methods of encoding by serializer/deserializer of an emulation chip of a hardware functional verification system.

BACKGROUND

Functional verification systems, including hardware emulation systems and simulation acceleration systems, utilize interconnected programmable logic chips or interconnected processor chips. Examples of systems using programmable logic devices are disclosed in, for example, U.S. Pat. No. 6,009,256 entitled "Simulation/Emulation System and Method," U.S. Pat. No. 5,109,353 entitled "Apparatus for emulation of electronic hardware system," U.S. Pat. No. 5,036,473 entitled "Method of using electronically reconfigurable logic circuits," U.S. Pat. No. 5,475,830 entitled "Structure and method for providing a reconfigurable emulation circuit without hold time violations," and U.S. Pat. No. 5,960,191 entitled "Emulation system with time-multiplexed interconnect." U.S. Pat. Nos. 6,009,256, 5,109,353, 5,036,473, 5,475,830 and 5,960,191 are incorporated herein by references. Examples of hardware logic to emulation systems using processor chips are disclosed in, for example, U.S. Pat. No. 6,618,698 "Clustered processors in an emulation engine," U.S. Pat. No. 5,551,013 entitled "Multiprocessor for hardware emulation," U.S. Pat. No. 6,035,117 entitled "Tightly coupled emulation processors," U.S. Pat. No. 6,051,030 entitled "Emulation module having planar array organization" and U.S. Pat. No. 7,739,093 entitled "Method of visualization in processor based emulation system." U.S. Pat. Nos. 6,618,698, 5,551,013, 6,035,117, 6,051,030, and 7,739,093 are incorporated herein by reference.

Functional verification systems help to shorten the time it takes to design a customized application specific integrated circuits (ASICs) by allowing designers to emulate the functionality of the ASIC before a production run has begun. Functional verification systems help to ensure ASICs are designed correctly the first time, before a final product is produced.

A particular functional verification system may contain numerous emulation chips that transmit data between one another. A serializer/deserializer (SerDes) is typically used to allow a large amount of data to transmit between chips, while minimizing the number of input/output (I/O) pins and interconnects needed by converting data between serial and parallel in each direction.

Hardware emulation systems can contain numerous emulation chips that communicate with one another. One method of encoding signals carried on the SerDes between emulation chips is known as 8B/10B, as described for example in U.S. Pat. No. 4,486,739. 8B/10B is typically a line code where each eight-bit data byte is converted to a 10-bit transmission character to achieve DC-balance and bounded disparity, while providing enough state changes to allow for reasonable clock recovery.

Although the present methods of encoding are useful to a degree, there still exists a need in the field for reduced latency, reduced error, and conservative serial streams. Thus, for at least these reasons there is a need for an improved method and system for encoding by a serializer/deserializer of an emulation chip of a hardware functional verification system.

SUMMARY

Systems and methods for encoding by a serializer/deserializer in an integrated circuit included in an emulation chip of a hardware functional verification system, are disclosed and claimed herein.

One general aspect includes a method of encoding data in a serializer/deserializer device of an integrated circuit, including the following: receiving a data word including a plurality of data bits at the serializer/deserializer device; appending an invert bit to the plurality of data bits, where the invert bit has a bit value; scrambling the plurality of data bits and the invert bit; generating a plurality of error correction code (ECC) check bits from the plurality of data bits and the invert bit; shuffling the plurality of data bits, the invert bit, and the plurality of ECC check bits to form an encoded word; and serially transmitting the encoded word from a transmitter of the integrated circuit.

Implementations may include one or more of the following features. The method may further include: calculating a disparity for the plurality of data bits, the invert bit, and the plurality of ECC check bits; comparing a first sign of the disparity against a second sign of a running disparity; and switching a bit value of the invert bit if the first sign matches the second sign. The method may be performed where the plurality of data bits include an embedded control bit and a plurality of emulation data bits. The method may be performed where the encoded word includes of twelve emulation data bits, one embedded control bit, six ECC check bits, and one invert bit. The method may be performed where scrambling is performed with a linear feedback shift register-based pseudo-random bitstream. The method may be performed where the plurality or ECC check bits are generated from less than all bits of the plurality of data bits and the invert bit. The method may further include serially transmitting a second encoded word from the transmitter, where each bit of a plurality of bits of the second encoded word are interleaved with each bit of the encoded word during transmission. The method may further include serially transmitting a copy of the encoded word from the transmitter immediately following the encoded word. The method may further include: serially transmitting a second encoded word from the transmitter immediately following the encoded word; serially transmitting a copy of the encoded word from the transmitter immediately following the second encoded word; and serially transmitting a copy of the second encoded word from the transmitter immediately following the copy of the encoded word. The method may be performed where the encoded word includes six ECC check bits and a bit order including a first three bits and a last three bits, where a first three bits are three of six ECC check bits and the last three bits are a remaining three of six ECC check bits.

One general aspect includes an integrated circuit serializer/deserializer, including: a communications interface to receive a plurality of data words at the integrated circuit serializer/deserializer, each data word including a plurality of data bits; a scrambler stage coupled to the communications interface that mixes the plurality of data bits and an invert bit with a deterministic bitstream to generate a plurality of scrambled bits; an error correction code (ECC) encoder coupled to an output of the scrambler stage to generate a plurality of ECC check bits from the plurality of scrambled bits; shuffler stage coupled to the ECC encoder and the scrambler stage to shuffle, according to a predetermined shuffling algorithm, the plurality of ECC check bits and the plurality of scrambled bits and to output an encoded word including the plurality of ECC check bits and the plurality of scrambled bits on a parallel bus; and a serializer coupled to the parallel bus to convert the encoded word into a serial word for transmission from the integrated circuit serializer/deserializer.

Implementations may include one or more of the following features. The integrated circuit serializer/deserializer may further include a DC balancer stage to receive the plurality of scrambled bits prior to the shuffler stage, and DC balance the plurality of scrambled bits. The integrated circuit serializer/deserializer may be such that the DC balancer stage inverts the plurality of scrambled bits when a sign of a calculated disparity of the scrambled bits matches a sign of a running disparity for a plurality of previously-transmitted encoded words. The integrated circuit serializer/deserializer may further include a deserializer to convert a serial bitstream including a second encoded word, a deshuffler stage to deshuffle the second encoded word, an error correction circuit, and an unscrambler stage. The integrated circuit serializer/deserializer may further include a DC unbalancing stage to invert the data bits according to an evaluation of the invert bit. The integrated circuit serializer/deserializer may further include an interleaving stage coupled to the parallel bus to interleave each bit of the encoded word with each bit of a plurality of bits of a second encoded word prior to the serializer. The integrated circuit serializer/deserializer may further include a copying stage coupled to the parallel bus to provide the encoded word to the serializer and to provide a copy of the encoded word to the serializer immediately following the encoded word. The integrated circuit serializer/deserializer may further include a copying stage coupled to the parallel bus to provide the encoded word to the serializer, to provide a second encoded word to the serializer immediately following the encoded word, to provide a copy of the encoded word to the serializer immediately following the second encoded word, and to provide a copy of the second encoded word to the serializer immediately following the copy of the encoded word.

One general aspect includes as hardware functional verification system, including: a plurality of interconnected emulation chips, including a first emulation chip. The first emulation chip may include a plurality of emulation processors. The first emulation chip may also include an encoder to encode a plurality of data words received from the plurality of emulation processors, the plurality of data words including emulation data generated by the plurality of emulation processors, where the encoder outputs an encoded plurality of data words, and where the encoder includes: a scrambler stage to mix, for each data word, each of a data word of the plurality of the data words and an invert bit with a deterministic bitstream to generate a plurality of scrambled bits; an error correction code (ECC) encoder to generate a plurality of ECC check bits from the plurality of scrambled bits; and a shuffler stage to use a predetermined shuffling algorithm to shuffle the plurality of ECC check bits and the plurality of scrambled bits. The first emulation chip may also include a serializer to convert a parallel signal representing the encoded plurality of data words into a serial bitstream of encoded words. The first emulation chip may also include a transmitter to transmit the serial bitstream of encoded words from the first emulation chip to a second emulation chip of the hardware functional verification system.

Implementations may include one or more of the following features: the hardware functional verification system where the encoder further includes a DC balancer stage to receive the plurality of scrambled bits prior to the shuffler stage, and where the DC balancer stage inverts the plurality of scrambled bits when a sign of a calculated disparity of the scrambled bits matches a sign of a running disparity for a plurality of previously-transmitted encoded words.

One general aspect includes a method of encoding data in a serializer/deserializer device of an integrated circuit, including: receiving a plurality of data words at the serializer/deserializer device; encoding the plurality of data words to generate a first encoded word and a second encoded word; interleaving the first encoded word with the second encoded word; and serially transmitting the interleaved encoded words from the integrated circuit.

Implementations may include one or more of the following features. The method may be performed where each of the first encoded word and the second encoded word includes a plurality of bits that each has a bit position within the encoded word, and where interleaving the first encoded word with the second encoded word includes alternating each bit of the first encoded word with each bit of the second encoded word. The method may be performed where interleaving the first encoded word with the second encoded word includes: generating a copy of the first encoded word. The method may also include generating a copy of the second encoded word. The method may also include positioning the copy of the first encoded word to serially transmit immediately following the first encoded word. The method may also include positioning the copy of the second encoded word to serially transmit immediately following the second encoded word. The method may be performed where interleaving the first encoded word with the second encoded word includes generating a copy of the first encoded word. The method may also include generating a copy of the second encoded word. The method may also include positioning the second encoded word to serially transmit immediately following the first encoded word. The method may also include positioning the copy of the first encoded word to serially transmit immediately following the second encoded word. The method may also include positioning the copy of the second encoded word to serially transmit immediately following the copy of the first encoded word.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations of the described techniques may include hardware, a method or process, or computer software on a computer-accessible medium.

These and other objects, features, aspects, and advantages of the embodiments will become better understood with reference to the following description and accompanying drawings.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

Figure 1:
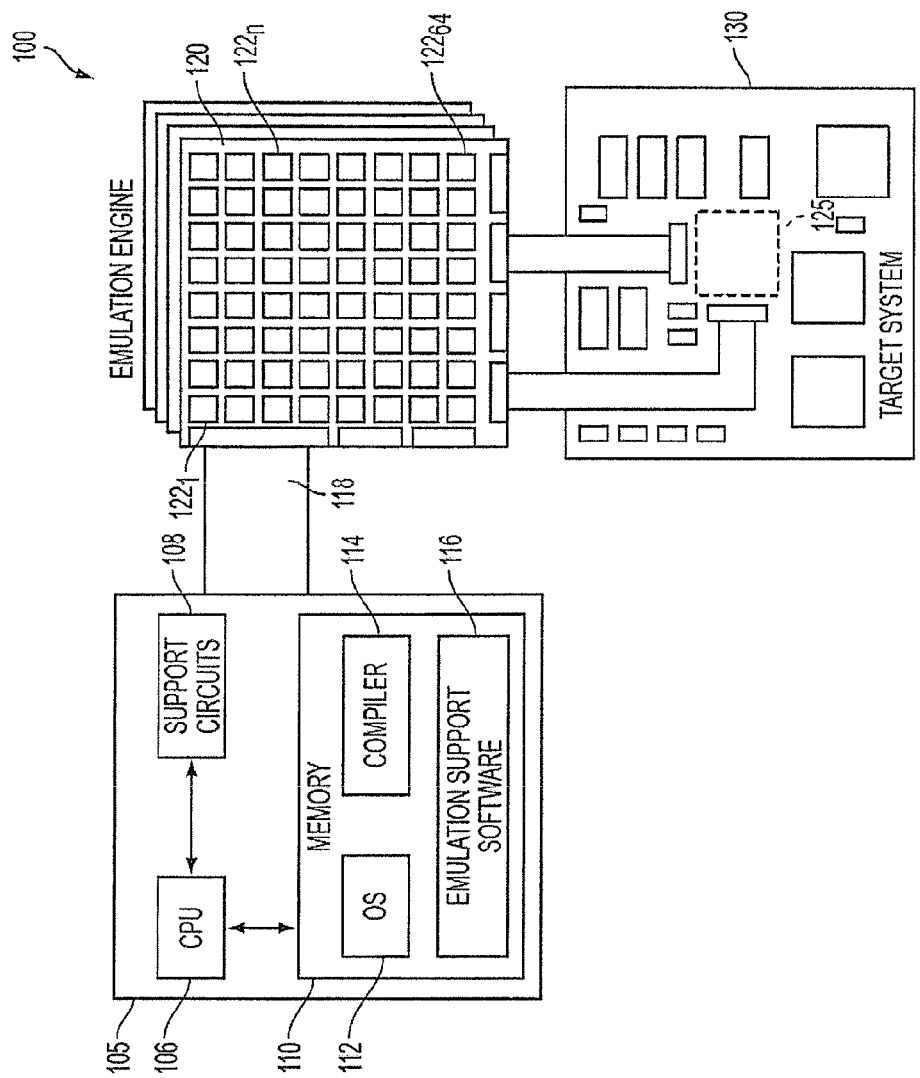
FIG. 1 illustrates an overview of one embodiment of a processor-based emulation system 100.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

A method and apparatus for encoding by a serializer/deserializer of an emulation chip of a hardware functional verification system is disclosed. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance or their work to others skilled in the art. An algorithm may be here, and generally, conceived to be a self-consistent sequence of steps leading to a desired result. The steps may be those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also disclosed is an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMS), erasable programmable read-only memories (EPROMs), electrically erasable programmable read-only memories (EEPROMs), magnetic or optical cards, or any type of media suitable for storing electronic instructions, and each coupled to a computer system bus.

Any algorithms that may be presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrates an overview of an embodiment of a processor-based emulation system 100. The system comprises a host or computer workstation 105, an emulation engine including at least one emulation board 120, and a target system 130. While a processor-based emulation engine is described, though other emulation engines, such as those utilizing arrays of programmable logic devices (such as FPGAs) may also be used, for example properly-configured versions of the systems discussed above.

The host workstation 105 provides emulation support facilities to the emulation engine 100 and emulation board 120. The host workstation 105, for example a personal computer, may comprise at least one central processing unit (CPU) 106, support circuits 108, and a memory 110. The CPU 106 may comprise one or more conventionally available microprocessors and/or microcontrollers. The support circuits 108 may be well known circuits that to used to support the operation of the CPU 106. These supporting circuits may comprise power supplies, clocks, input/output interface circuitry, cache, and other similar circuits.

Memory 110, sometimes referred to as main memory, may comprise random access memory, read only memory, disk memory, flash memory, optical storage, and/or various combinations of these types of memory. Memory 110 may in part be used as cache memory or buffer memory. Memory 110 may store various forms of software and files for the emulation system, such as an operating system (OS) 112, a compiler 114, and emulation support software 116.

The compiler 114 converts a hardware design, such as hardware described in VHDL or Verilog programming language, to a sequence of instructions that can be evaluated by the emulation board 120.

The host workstation 105 allows a user to interface with the emulation engine 100 via communications channel 118, including emulation board 120, and control the emulation process and collect emulation results for analysis. Under control of the host workstation 105, programming information and data is loaded to the emulation engine 100. The emulation board 120 has on it a number of individual emulation chips, for example the 64 emulation chips $122_1$ to $122_{64}$ (collectively 122) shown in FIG. 1, in addition to miscellaneous support circuitry. There may be any number of emulation chips. The emulation chips 122 are designed to mimic the functionality of any synchronous ASIC design using programmable logic. This is done in order for chip designers to prototype their ASIC design using processor based emulation before having actual silicon in hand. Communication between emulation chips 122 is established via serial I/Os links. There may be numerous output lanes per emulation chip 122. Some of the I/Os links may remain on the card on copper. For longer connections to other cards, the signals may be relayed through optical transceivers and cables.

In response to programming received from the emulation support software 116, emulation engine 100 emulates a portion 125 of the target system 130. Portion 125 of the target system 130 may be an integrated circuit, a memory, a processor, or any other object or device that may be emulated in a programming language. Exemplary emulation programming languages include Verilog and VHDL.

Figure 2:
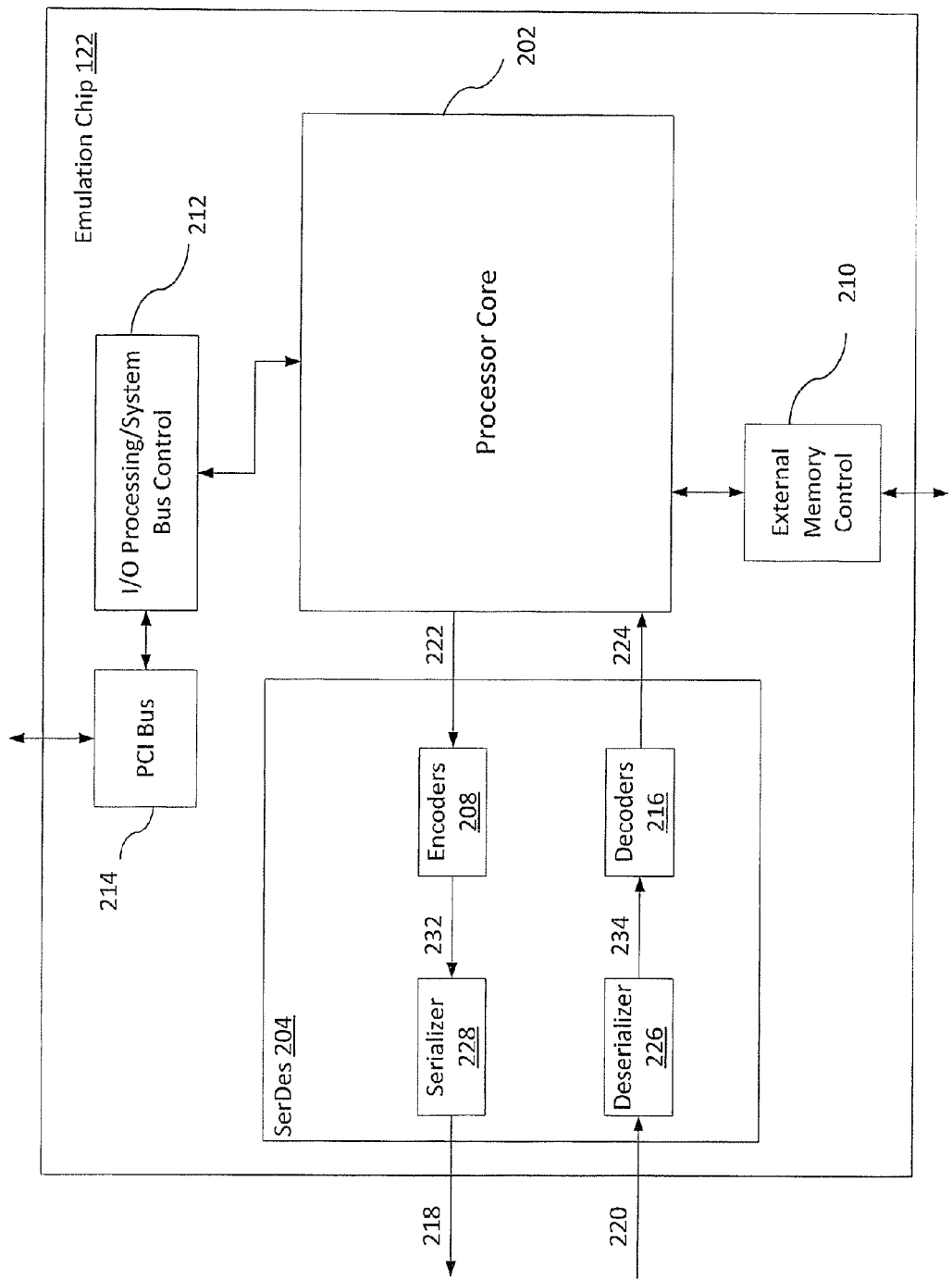
FIG. 2 illustrates a block diagram of one embodiment of an emulation chip of a hardware functional verification system.

FIG. 2 illustrates a block diagram of one embodiment of an emulation chip of a hardware functional verification system. The device of FIG. 2 is an embodiment of one of the emulation chips $122_1$ to $122_{64}$ (collectively 122) shown in FIG. 1. An emulation chip 122 has a processor core 202 where instructions are carried out, such as instructions for emulation of a circuit design, the processor core including emulation processors arranged in a hierarchy of processor clusters, embedded memory, interconnect, and communications and other emulation support circuitry. The I/O processing/system bus control 212 controls the peripheral component interconnect (PCI) bus 214. The PCI bus may also be a general I/O bus. In other embodiments, the PCI bus may be a PCI bus with higher speed than a standard PCI bus. During the emulation process, the processor core 202 may send processed data to or received processed data from the SerDes 204. SerDes 204 may include components that may be considered part of a physical coding sublayer (or PCS) logic. The SerDes 204 contains the encoders 208. The encoders 208 encode the data according to a selected mode. The encoded data is then serialized prior to transmission on output link 218 to another emulation chips 122 of the system, or other destinations. The SerDes 204 also deserializes incoming data from other emulator chips 122 on input link 220, and decodes the data with decoders 216. The emulator chips 122 may also contain an external memory control 210 in communication with the processor 202. The parallel data interfaces of the SerDes are typically synchronous to the main on-chip clock. Typically, the SerDes 204, encoders 208, and decoders 216 may be implemented with hardware. In other embodiments, the SerDes 204, encoders 208, and decoders 216 may also be implemented with software.

FIG. 2 illustrates a single SerDes 204. However, the SerDes 204 in physical implementation may comprise multiple individual serializer/deserializer blocks that may perform the encoding and decoding described in the present disclosure in parallel for a number of different interconnections. For example, it is contemplated that a typical hardware functional verification system may have many thousands or even millions of such interconnections. Encoding and the corresponding decoding (on a different emulation chip) may also be customized to a particular serializer/deserializer block, such that the encoding and decoding modes used for a particular interconnection may be different, even between the same set of emulation chips.

In other contexts where a SerDes is implemented, a hardware developer is typically concerned about maximizing throughput or bandwidth, i.e. to provide the maximum rate to data transmission across an interface that is possible. In such applications, error correction may be used to correct errors introduced by the SerDes during parallel to serial data conversion or during transmission of the serialized data. Such error correction schemes may introduce significant latency during correction. However, in typical SerDes applications, there is little concern for the amount of latency that may be introduced in the serial stream for a particular transmitted packet when performing error correction. In the context of a hardware functional verification system (emulator) that runs synchronously, however, the system typically lacks the ability to retransmit packets that have errors that cannot be corrected after receipt because various components of the system run synchronously. Thus, while it is still desirable to minimize latency, it is also desirable to maximize transmission accuracy to provide an ultra-low bit error rate (BER). While the context of an emulator is discussed below, the disclosed techniques may be used in various technological contexts and implementations, especially where maximum transmission accuracy (low BER) is desired and low latency is also needed.

According to an embodiment, the encoders 208 of the SerDes 204 encode data words to be transmitters on output link 218 in a default mode having a number of different encoding stages.

The encoders 208 can encode data words for transmission according to a number of encoding modes, including a default mode. This default encoding mechanism is also referred to herein a 13B/20B encoding mode. The term 13B/20B may be used in contexts outside the present document to refer to other encoding mechanisms. In contrast, according to this embodiment, the default encoding mode (13B/20B) includes at least the following encoding stages prior to transmission: invert bit insertion, scrambling, ECC check bit insertion, DC balancing, and shuffling.

Figure 5:
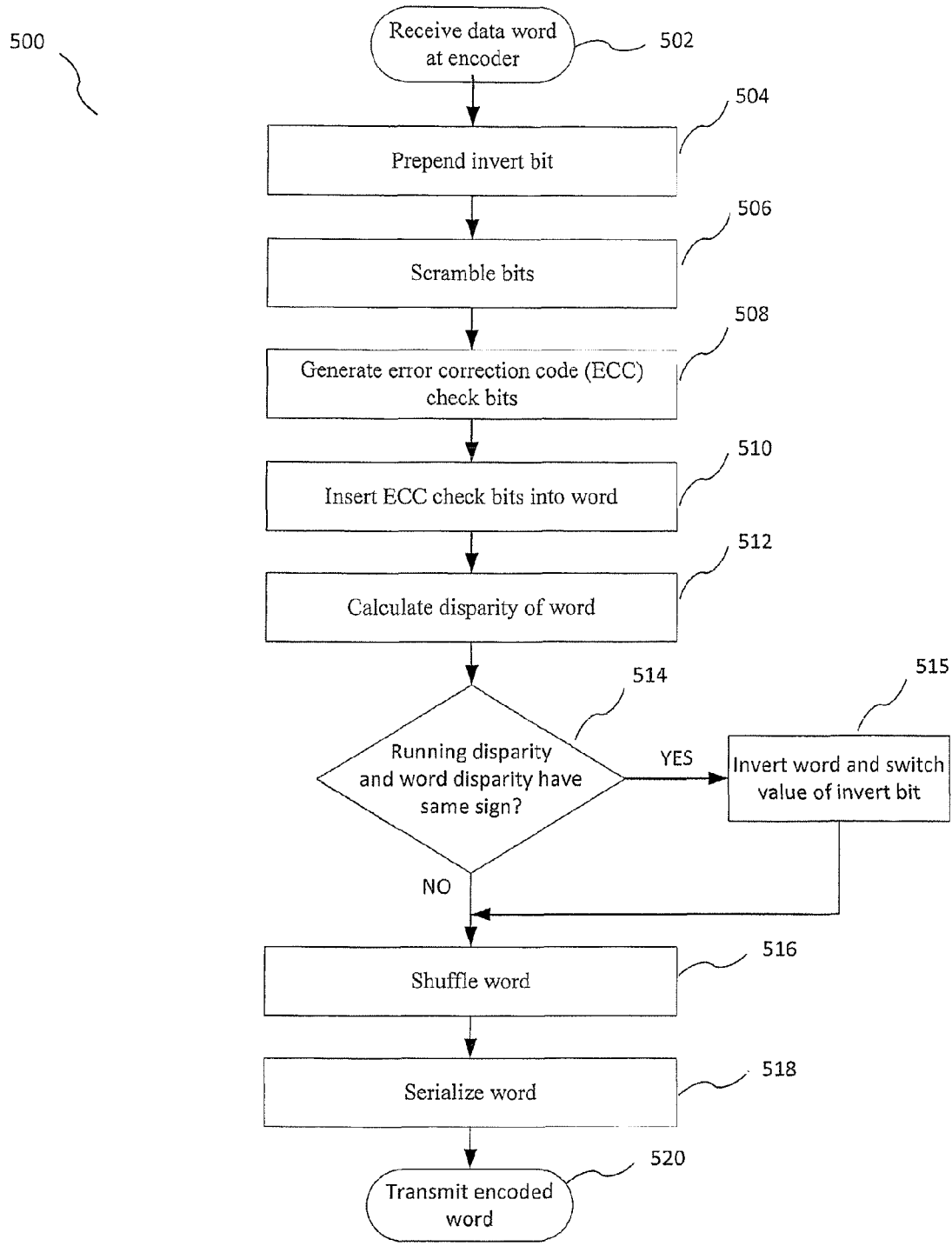
FIG. 5 illustrates a flow for encoding a data word according to a default mode embodiment described herein.

FIG. 5, illustrates a flow for encoding the received data word according to the default mode embodiment. Thirteen data bits are encoded for transmission (twelve data bits plus an embedded control bit (ECB)). The twelve data bits normally carry design data while emulation is in progress, and the ECB bit (the thirteenth data bit) is used during emulation to conduct system-level signaling and synchronization between chips. Each step takes these thirteen bits and converts them into twenty physical bits suitable for transmission over an output link.

First, at step 502 encoders 208 first receive the thirteen data bits (a data word) from the processor 202 via communications interface 222.

At step 504, an invert bit is prepended to the thirteen data bits. The invert bit initially has a bit value of "0". Alternatively, the invert bit may be appended to the end of the data word instead, or inserted at another set location within the data word. The invert bit may be used later by the DC balancing mechanism to indicate that the entire word has been inverted for transmission.

At step 506, the fourteen bits of the data word are scrambled. Scrambling mixes the fourteen data bits (thirteen data bits plus the invert bit) using a linear-feedback shift register (LFSR)-based pseudo-random bitstream. This process converts the stream of data words so that the stream has statistically a 50% transition density over sufficiently long sequences of data words. In one embodiment, the LFSR has a length of sixty-four (64) bits and can be initialized to an arbitrary initial value. The taps for this LFSR are set to bits 63, 62, 60, and 59. In other embodiments, an LFSR having a different length or tap configuration may be used. To avoid error cascades if a multi-bit error does manage to get through the ECC logic, scrambling is based on an additive (synchronous) scrambler.

During step 508, error correction code (ECC) check bits are generated. The ECC may be chosen so that each of the check bits is formed from the linear addition of 7 of the data bits, i.e. using an exclusive—OR(XOR) function. This balanced allocation of code words may be preferred so that inverting the data results in inverted check bits. The ECC table should be tolerant of inversion, which allows for DC balancing, while still allowing for ECC on each data word that is to be transmitted. In particular, the ECC table should be selected so that inverting the data results in inverted check bits. If this were not the case, there could be some data words where it would not be true that the sign of the disparity for the current data word would be not equal to the opposite sign of the disparity of the inverted current data word. That is, in order for the DC balancing (further discussed below) to operate correctly, the following equation should be true:

$$\text{sign}[\text{disparity}(\{\text{DATA},\text{CHECK}_{DATA}\})] = \text{sign}[-\text{disparity}(\{\sim\text{DATA},\text{CHECK}\sim_{DATA}\})]$$

A representative ECC table, which may be stored in a memory or registers, or used by the HDL implementation of the encoder, and therefore implemented with synthesized logic gates, and which provides for such functionality according to one embodiment is shown in Table 1 below.

TABLE 1

| ECC BIT | DATA BIT | | | | | | | | | | | | | |
|---|---|---|---|---|---|---|---|---|---|---|---|---|---|---|
| | 13 | 12 | 11 | 10 | 9 | 8 | 7 | 6 | 5 | 4 | 3 | 2 | 1 | 0 |
| 5 | X | X | X | X | X | X | X | | | | | | | |
| 4 | X | X | X | X | | | | X | X | X | | | | |
| 3 | X | | | | X | X | X | | | | X | X | X | |
| 2 | | X | | | X | | | X | X | | X | X | | X |
| 1 | | | X | | | X | | X | | X | X | | X | X |
| 0 | | | | X | | | X | | X | X | | X | X | X |

In Table 1, the columns represent bits in data to encode while the rows represent the resulting error correction bits. The error correction is done using addition modulo 2, i.e., with an exclusive or function. Thus, for example, if the data to be transmitted is "0000000000001," then ECC=000111, as shown in the right-hand "0" column. In another example, if the data to be transmitted is "00000000000010," then ECC=001011, as seen in column "1." In yet another example, if the data to be transmitted is "00000000000011," then ECC=000111 (column "0") $\oplus$ 001011 (column "1"), which results in 001000.

In step 510, the ECC check bits are inserted into the data word. The ECC bit insertion stage prepends the six (6) ECC check bits into the fourteen (14) bits of data input resulting in a twenty (20) bit word. Alternatively, the ECC bits may be appended to the end of the data word or another location within the data word.

Figures 3, 4:
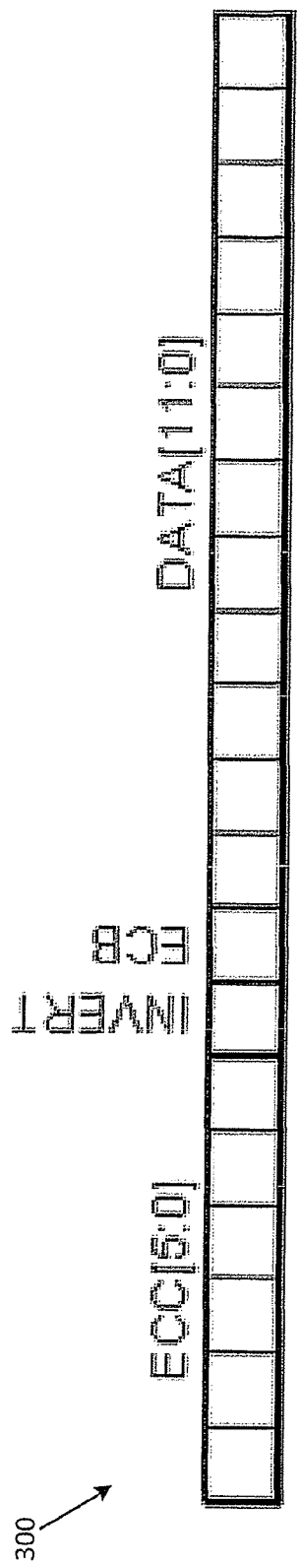
FIG. 3 is an illustration of a data bits of a word prior to encoding.
FIG. 4 is an illustration of the order of the data bits of the encoded word.

In the embodiment where each of the ECB, invert bit, and ECC bits are prepended to the data bits, in that order, the resulting data word is as illustrated in FIG. 3, where DATA [11:0] is the twelve data bits' positions, ECB is the ECB bit position, INVERT is the invert bit position, and ECC[5:0] is bit positions of the six ECC check bits.

Blocks 512 and 514 relate to DC balancing the word to be transmitted. The physical encoding ensures that the physically transmitted data is DC-balanced over medium and long time scales, that the transition density is about 50% statistically. A DC balanced data stream typically has an equal number of 0's and 1's in the data stream over sufficiently long sequences.

In a DC balancing stage of a default mode, the DC balancing operates by monitoring the running disparity of the transmitted data and inverting a word when a word's disparity and the running disparity have the same sign; this is possible because the error correcting code is chosen such that inverting the data inverts the check bits. The disparity of a word is the difference between the number of 1s and the number of 0s. If a word has eleven 1's and nine 0's, the disparity of that word is +2. If there are fewer 1's than 0's, the disparity has a negative sign. Of course, the selection of signs is arbitrary as long as it is consistently used in the encoding, and the sign used could be reversed in another embodiment. The running disparity is the difference in the total number of 1's and 0's over time, counted after inversion, if any, of a word. A goal of DC balancing is to keep the running disparity near zero over sufficiently long sequences.

First, in step 512, the disparity of the current word is calculated. At step 514 the disparity of the word is compared against the running disparity to determine whether they have the same sign, i.e. whether both disparities are positive, whether both disparities are negative. If the sign is the same, then the current data word is inverted at step 515. Because the invert bit was set to a value of "0" when it was prepended to the data word, inversion gives the invert bit a value of "1", which will indicate at the receiver that the word has been inverted. If the sign of the disparity of the word and the running disparity are different, then the word is not inverted. Either if inverted or not, the next step is to shuffle the word at step 516.

In a shuffling stage of the default mode, the shuffling stage shuffles the order of the bits in the twenty-bit word. FIG. 4 illustrates the default data order of a serial protocol 400 after shuffling of the bits. Shuffling may reduce the average and maximum run length of the serial data by breaking up long runs in the input data with ECC bits. The shuffle order as seen in FIG. 4 was chosen via simulation to minimize worst-case run-length. In other embodiments, other shuffle orders may be used, which may provide other benefits or also minimize worst-case run-length.

After the word is shuffled it is now encoded for transmission, and may be serialized at step 518 for transmission of the encoded word at step 520 from the SerDes 204 over interconnect 218. Transmission over the serial interconnection 218 may be least-significant bit first or most-significant end first. However, least-significant bit transmission may use a different shuffle than most-significant bit transmission in order to optimize the run length of the transmitted data.

Figure 6:
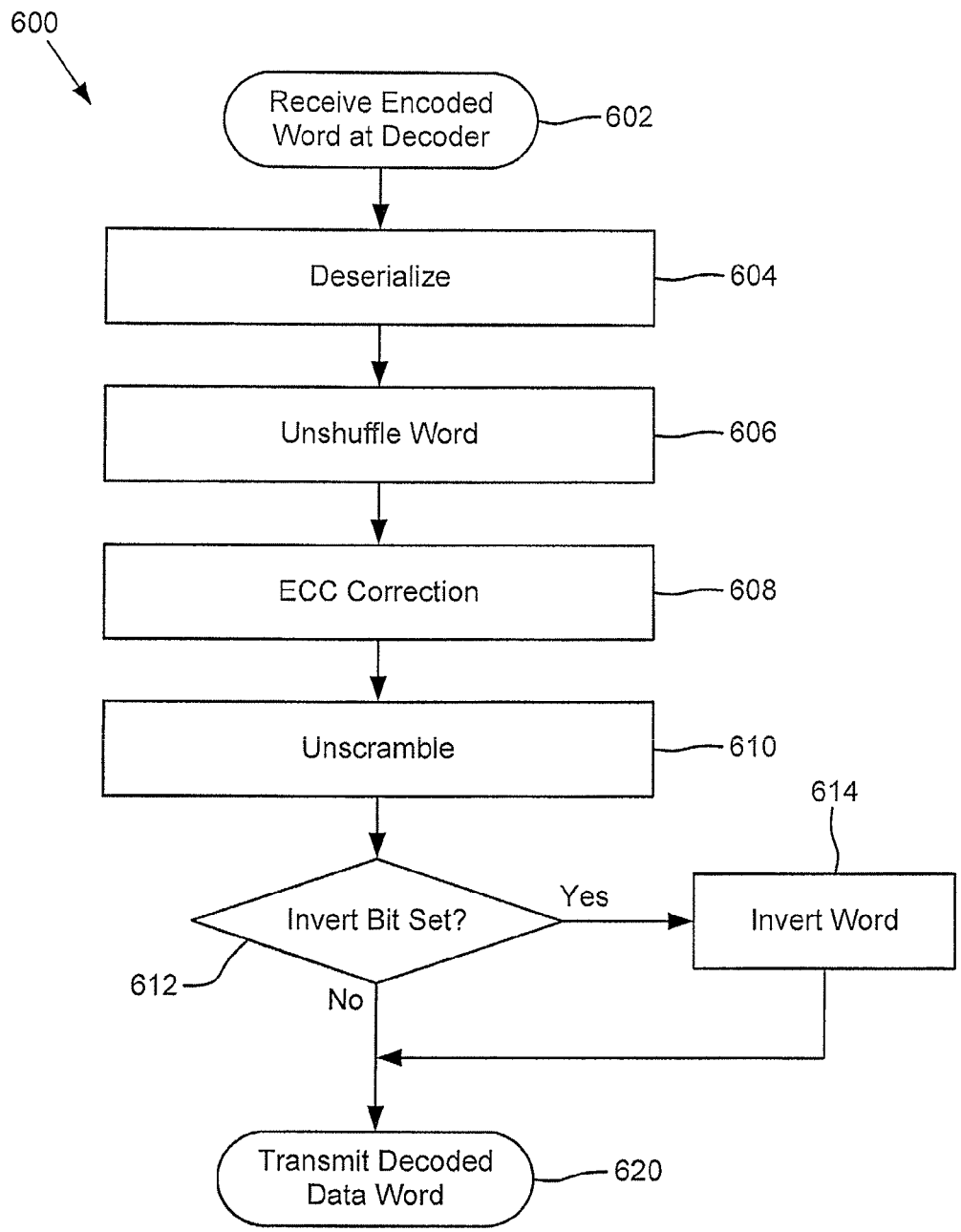
FIG. 6 illustrates a flow for decoding data words encoded according to the flow illustrated in FIG. 5 according to the default embodiment described herein.

A word encoded according to the flow illustrated in FIG. 5 may be decoded following a flow as illustrated in FIG. 6. At block 602, the encoded word is received at a decoder, for example received over serial interconnect 220 to decoder 208. At step 604 the serial data is deserialized then unshuffled in step 606. The unshuffling takes a word whose bits are shuffled as illustrated in FIG. 4 and puts the bits back in their original bit positions in the word, as illustrated in FIG. 3. An ECC reversal algorithm is applied in step 608. The algorithm checks the ECC check bits and data, and can correct single-bit errors. According to another embodiment, where there has been a single-bit error correction, a single-bit error correction flag may be output. Double-bit errors may be detected, although not corrected, and a double-bit error detection flag output. After ECC correction, the fourteen data bits (thirteen plus inversion bit) remain. At step 610, the data is unscrambled. Unscrambling undoes the scrambling operation at the encoder. Unscrambling involves running the configuration LFSR with the same initialization value that is used in the scrambler of the encoder. It is contemplated that the descrambler and the scrambler may be synchronized before scrambling is enabled in the system, although self-synchronization techniques may also be used in other embodiments.

At step 612, the decoder checks whether the invert bit has been set, i.e. if it has a value of "1" and discards the invert bit. If yes, then the data word is inverted at step 614, and if no, then there is no inversion. Whether inverted or not, the thirteen data bits remain in the word, and that word is transmitted from the decoder 208 in the SerDes 204 via decoder output 224 towards its destination at step 620.

The serializer/deserializer may have multiple alternate modes in addition to the default 13B/20B mode discussed with respect to FIGS. 5 and 6. These further embodiments use the same 13B/20B encoding described above, but add the alternate modes to increase the bit-error rate of the system. The interleave mode or the copy mode described below may be performed after encoding the data word but prior to serialization for transmission, i.e. after the shuffle step 516 but before serialize step 518 in FIG. 5. On the decoding side, the alternate modes would be undone after deserialization of the received word, but prior to the beginning of the rest of the decoding steps, i.e. after deserialization step 604 but before the unshuffled step 606 in FIG. 6.

One alternate mode for the serializer/deserializer may be an interleaving mode. An interleave mode may trade a small amount of latency for an increase in error tolerance. Interleaving may be used in digital communication systems generally to improve the performance of error correcting codes. Typically, errors may occur in bursts across more than one bit rather than independently in individual nonsequential bits. For example, in the case of small burst errors, interleaving several data words together can spread a burst error across several words, thereby improving the error correcting codes capability of recovering the particular words that were affected by the errors. In an interleaving mode, the encoding process may be the same as the default mode, except that the words are interleaved after encoding, but before serialization, within the serializer/deserializer 204. One way of interleaving the bits of the words is by taking the first bit [0] of a first word (word0), followed by a first bit [0] of a second word (word 1), followed by a third bit [2] of the first word (word 0), followed by the third bit [2] of the second word (word1), with the second bits of each word added later, as shown for example by the bit stream: (word0[0], word1[0], word0[2], word1[2]...word0[1], word[1]...), this interleave mode may be referred to as Interleave-2. As shown in the bit stream above, the second bit [1] of first word (word0), and the second bit [1] of second word (word[1]) can be interleaved at any point later in the bit stream. In another interleave mode, the bits of the words may be interleaved as: (word0[0], word1[0], word2[0], word3[0], word0[4], word1[4]...), this interleave mode may be referred to as Interleave-4. In Interleave-4 as shown above, word3 may be a fourth word. Also it is noted that [4] denotes a fifth bit of a word, such as the fifth bit of a first word (word0) by word0[4].

On the receiver side, the interleaved encoded words may be de-interleaved by performing the inverse algorithm after deserialization, for example by deserializer 226, but prior to the decoding process of decoders 216.

Another alternate mode for the serializer/deserializer may be a copying mode. A copying mode may send a word multiple times. Like interleaving, copying may be performed after encoding by encoder 208, but prior to serialization by serializer 228. This may result in reduced bandwidth as well as increased latency, but also an increase in the tolerance for very long error bursts. In a copying mode, which may also be referred to herein as a type of interleaving, the encoding process ignores data for half the incoming words, and instead sends a copy of a word (from 1 word ago, 2 words ago, or 4 words ago, depending on the mode). At the receiver, both copies are checked for valid ECC, and if one word in error the other word will then be chosen. One copy mode, which may be referred to as "Copy 1" mode, sends a first word "word0," then a copy of the same word "word0," followed by a third word "word2," followed by a copy of the third word "word2" again as seen in the stream: word0, word0, word2, word2, word4...). A second copy mode, which may be referred to as "Copy 2" mode, may be shown in the stream (word0, word1, word0, word1, word4, word5, word4, word5...). Another copy mode, which may be referred to as "Copy4" mode, may be shown in the stream (word0, word1, word2, word3, word0, word2, word3, word8, word9...). Copy modes may indicate three different types of error—single error correct (SEC), double error detect (DED), and ERR (which is flagged when a DED error occurs on both copies of a data word). Copy modes trade both latency and bandwidth for a large increase in error tolerance.

On the receiver side, where the error correction circuit detects an error in one copy, it looks to the other copy or copies of data to see if there are errors in that copy or copies. If both copies, for example for a Copy 2 mode, contain two or more errors there will there be uncorrectable errors in the received encoded data, but as long as one or more copies of the encoded data have no errors or a single error, then the encoded word will be valid or valid after correction of the single error.

Figure 7:
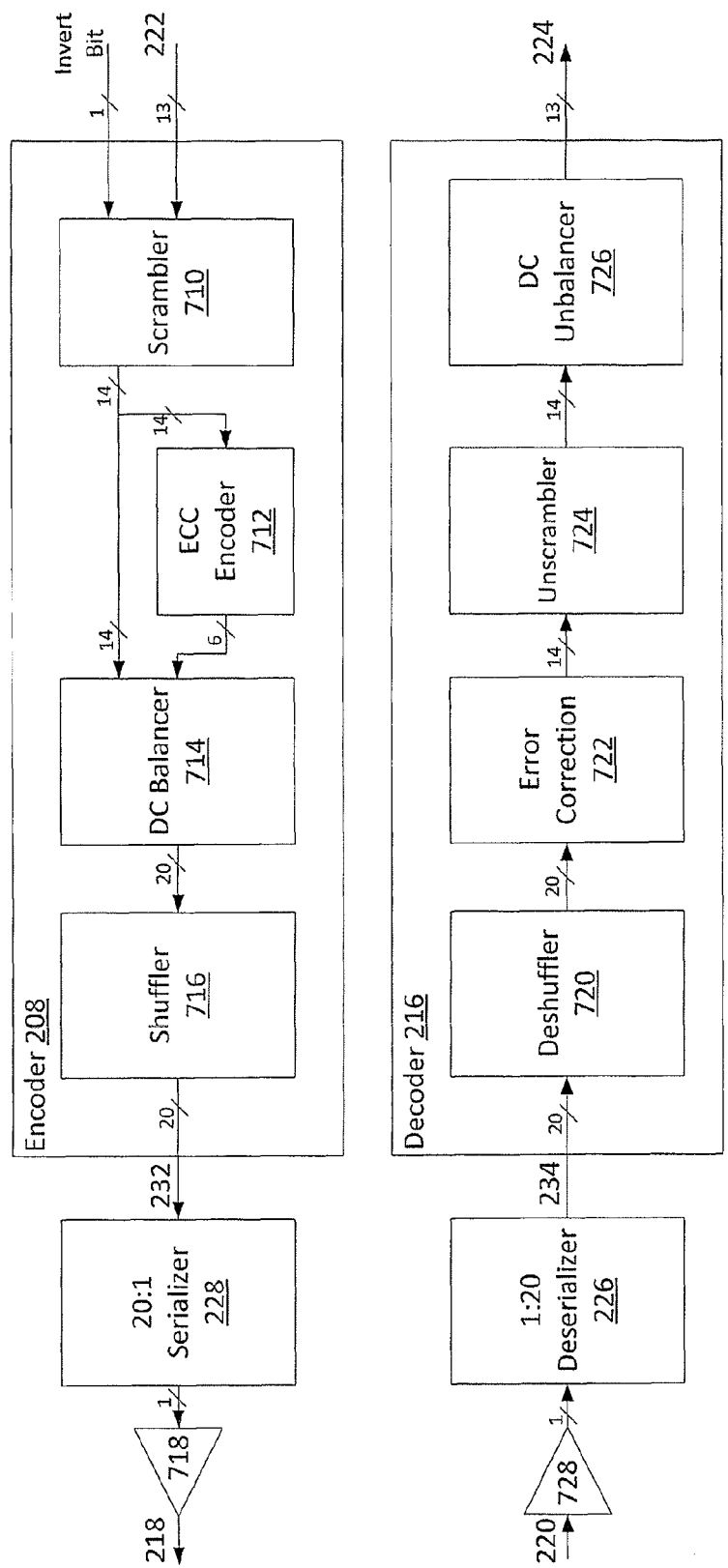
FIG. 7 is an illustration of a portion of a serializer/deserializer, including an encoder and a decoder to implement the encoding and decoding according to an embodiment.

FIG. 7 illustrates a portion of a SerDes 204, including an encoder 208 and decoder 218 to implement the encoding/decoding according to an embodiment. According to an embodiment, the encoder 208 receives thirteen data bits at a communications interface 222. The scrambler stage 710 prepends an invert bit to the thirteen data bits and scrambles the fourteen bits using the previously-described linear-feedback shift register (LFSR)-based pseudo-random bitstream. The ECC encoder 712 stage generates six ECC bits according to the inversion-tolerant ECC table shown in Table 1 from the fourteen scrambled bits. The DC balancer stage 714 operates on twenty bits: both the six ECC bits and the fourteen bits from the scrambler. The DC balancer calculates the disparity between the number of "1"s and "0"s, and compares the sign of the disparity against the running disparity of the transmitted data that it has monitored. Where the signs of the calculated current disparity and the running disparity are the same, the twenty bits are inverted. The shuffler stage then shuffles the order of the bits from the order 300 to order 400. Shuffling may reduce the average and maximum run length of the serial data by breaking up long runs in the input data with ECC bits.

Next, a twenty-to-one serializer 228 converts the parallel encoded twenty bits into a serial signal that is transmitted by transmitter 718 on a transmission line 218. Although illustrated as a single line, transmission line 218 may comprise pairs of conducting wires, an optical fiber, or another serial transmission medium.

On the decoder side, the receiver 728 receives a serial signal of a plurality of encoded words over interconnection or transmission line 220. The deserializer 226 converts the encoded word into a parallel signal 234 to be decoded. First deshuffler 720 applies a deshuffling algorithm to deshuffle the bit order. For example, where the shuffler operates to move bit positions from order 300 to order 400, the deshuffler may operate to move bit positions from order 400 back to order 300 for each word. Error correction circuit 722 then corrects a single bit error in the fourteen bits of the word that are not the six ECC check bits by comparing the actual bit values against the expected bit values, and discarding the ECC check bits. The remaining fourteen bits are then unscrambled in the unscramble stage 724. Unscrambling involves running the configuration LFSR with the same initialization value that is used in the scrambler or the encoder. Where the DC unbalancer 726 detects that the invert bit has been sent, i.e. where it has a bit value of "1" when the default bit value of the invert bit is "0", then the DC unbalance 726 inverts the bits and outputs the thirteen data bits over communication interface 224.

Although the embodiments have been described with reference to the drawings and specific examples it will readily be appreciated by those skilled in the art that many modifications and adaptations of the apparatuses and processes described herein are possible without departure from the spirit and scope of the embodiments as claimed hereinafter. Thus, it is to be clearly understood that this description is made only by way of example and not as a limitation on the scope of the claims.

We claim:

1. A method of encoding data in a serializer/deserializer device of an integrated circuit, comprising:
   receiving a data word comprising a plurality of data bits at the serializer/deserializer device;
   appending an invert bit to the plurality of data bits, wherein the invert bit has a bit value;
   scrambling the plurality of data bits and the invert bit;
   generating a plurality of error correction code (ECC) check bits from the plurality of data bits and the invert bit based on a contents of an ECC table;
   shuffling the plurality of data bits, the invert bit, and the plurality of ECC check bits to form an encoded word; and
   serially transmitting the encoded word from a transmitter of the integrated circuit.

2. The method of claim 1, further comprising:
   calculating a disparity for the plurality of data bits, the invert bit, and the plurality of ECC check bits;
   comparing a first sign of the disparity against a second sign of a running disparity; and
   switching a bit value of the invert bit if the first sign matches the second sign.

3. The method of claim 1, wherein the plurality of data bits comprise an embedded control bit and a plurality of emulation data bits.

4. The method of claim 3, wherein the encoded word consists of twelve emulation data bits, one embedded control bit, six ECC check bits, and one invert bit.

5. The method of claim 1, wherein scrambling is performed with a linear feedback shift register-based pseudo-random bitstream.

6. The method of claim 1, wherein the plurality of ECC check bits are generated from less than all bits of the plurality of data bits and the invert bit.

7. The method of claim 1, further comprising:
   serially transmitting a second encoded word from the transmitter, wherein each bit of a plurality of bits of the second encoded word are interleaved with each bit of the encoded word during transmission.

8. The method of claim 1, further comprising:
   serially transmitting a copy of the encoded word from the transmitter immediately following the encoded word.

9. The method of claim 1, further comprising:
   serially transmitting a second encoded word from the transmitter immediately following the encoded word;
   serially transmitting a copy of the encoded word from the transmitter immediately following the second encoded word; and
   serially transmitting a copy of the second encoded word from the transmitter immediately following the copy of the encoded word.

10. The method of claim 1, wherein the encoded word comprises six ECC check bits and a bit order including a first three bits and a last three bits, wherein a first three bits are three of six ECC check bits and the last three bits are a remaining three of six ECC check bits.

11. The method of claim 1, wherein the ECC table is stored in a memory or a plurality of registers.

12. The method of claim 1, wherein the ECC table is synthesized into logic gates.

13. An integrated circuit serializer/deserializer, comprising:
    a communications interface to receive a plurality of data words at the integrated circuit serializer/deserializer, each data word comprising a plurality of data bits;
    a scrambler stage coupled to the communications interface that mixes the plurality of data bits and an invert bit with a deterministic bitstream to generate a plurality of scrambled bits;
    an error correction code (ECC) encoder coupled to an output of the scrambler stage to generate a plurality of ECC check bits from the plurality of scrambled bits based on a contents of an ECC table;
    shuffler stage coupled to the ECC encoder and the scrambler stage to shuffle, according to a predetermined shuffling algorithm, the plurality of ECC check bits and the plurality of scrambled bits and to output an encoded word comprising the plurality of ECC check bits and the plurality of scrambled bits on a parallel bus; and
    serializer coupled to the parallel bus to convert the encoded word into a serial word for transmission from the integrated circuit serializer/deserializer.

14. The integrated circuit serializer/deserializer of claim 13, further comprising a DC balancer stage to receive the plurality of scrambled bits prior to the shuffler stage, and DC balance the plurality of scrambled bits.

15. The integrated circuit serializer/deserializer of claim 14, wherein the DC balancer stage inverts the plurality of scrambled bits when a sign of a calculated disparity of the scrambled bits matches a sign of a running disparity for a plurality of previously-transmitted encoded words.

16. The integrated circuit serializer/deserializer of claim 13, further comprising a deserializer to convert a serial bitstream comprising a second encoded word, a deshuffler stage to deshuffle the second encoded word, an error correction circuit, and an unscrambler stage.

17. The integrated circuit serializer/deserializer of claim 16, further comprising a DC unbalancing stage to invert the data bits according to an evaluation of the invert bit.

18. The integrated circuit serializer/deserializer of claim 13, further comprising an interleaving stage coupled to the parallel bus to interleave each bit of the encoded word with each bit of a plurality of bits of a second encoded word prior to the serializer.

19. The integrated circuit serializer/deserializer of claim 13, further comprising copying stage coupled to the parallel bus to provide the encoded word to the serializer and to provide a copy of the encoded word to the serializer immediately following the encoded word.

20. The integrated circuit serializer/deserializer of claim 13, further comprising a copying stage coupled to the parallel bus to provide the encoded word to the serializer, to provide a second encoded word to the serializer immediately following the encoded word, to provide a copy of the encoded word to the serializer immediately following the second encoded word, and to provide a copy of the second encoded word to the serializer immediately following the copy of the encoded word.

21. The integrated circuit serializer/deserializer of claim 13, wherein the ECC table is stored in a memory or a plurality at registers.

22. The method of claim 13, wherein the ECC table is synthesized into logic gates.

23. A hardware functional verification system, comprising:
a plurality of interconnected emulation chips, a first emulation chip comprising:
a plurality of emulation processors;
an encoder to encode a plurality of data words received from the plurality of emulation processors, the plurality of data words including emulation data generated by the plurality of emulation processors, wherein the encoder outputs an encoded plurality of data words, and wherein the encoder comprises:
a scrambler stage to mix, for each data word, each of a data word of the plurality of the data words and an invert bit with a deterministic bitstream to generate a plurality of scrambled bits;
an error correction code (ECC) encoder to generate a plurality of ECC check bits from the plurality of scrambled bits based on a contents of an ECC table; and
a shuffler stage to use a predetermined shuffling algorithm to shuffle the plurality of ECC check bits and the plurality of scrambled bits; and
a serializer to convert a parallel signal representing the encoded plurality of data words into a serial bitstream of encoded words; and
a transmitter to transmit the serial bitstream of encoded words from the first emulation chip to a second emulation chip of the hardware functional verification system.

24. The hardware functional verification system of claim 23, wherein the encoder further comprises a DC balancer stage to receive the plurality of scrambled bits prior to the shuffler stage, wherein the DC balancer stage inverts the plurality of scrambled bits when a sign of a calculated disparity of the scrambled bits matches a sign of a running disparity for a plurality of previously-transmitted encoded words.

* * * * *